United States Patent [19]

Litt et al.

[11] Patent Number: 5,489,759
[45] Date of Patent: Feb. 6, 1996

[54] METHOD AND DEVICE FOR ALIGNING A TOOL HELD BY A ROBOT

[75] Inventors: Richard O. Litt, Rapid City, Ill.; Christopher J. Schilb, Bettendorf, Iowa; Brian C. Gorge, Moline, Ill.

[73] Assignee: Genesis Systems Group, Davenport, Iowa

[21] Appl. No.: 363,389

[22] Filed: Dec. 23, 1994

[51] Int. Cl.[6] .................................................. B23K 9/12
[52] U.S. Cl. ........................ 219/124.34; 901/42; 901/46
[58] Field of Search ......................... 219/124.34, 125.1, 219/137 R; 901/42, 46; 200/61.41, 61.42, 332

[56] References Cited

U.S. PATENT DOCUMENTS

| | | | |
|---|---|---|---|
| 3,866,004 | 2/1975 | Nawrocki | 200/61.42 |
| 5,013,887 | 5/1991 | Gold | 219/124.34 |
| 5,329,092 | 7/1994 | Weaver et al. | 219/124.34 |

*Primary Examiner*—Clifford C. Shaw

*Attorney, Agent, or Firm*—Zarley, McKee, Thomte, Voorhees, & Sease

[57] ABSTRACT

A device for indicating the alignment of a tool held by the arm of a robot includes a frame mounted at a known coordinate, an electrical switch mounted on the frame and connected to the robot, a lever having opposite first and second end portions and a central portion therebetween pivotally connected to the frame such that the first end portion normally makes contact with the switch in the absence of outside forces on the lever. The second end portion of the lever has a target bore therein for receiving the tool with a given tolerance for misalignment of the tool. If the tolerance is exceeded, the tool engages the second end portion of the lever and forcibly pivots the first end portion out of contact with the switch to indicate misalignment of the tool. The method of checking alignment with this device includes positioning the tool in an expected position of alignment with the target bore, moving the tool into the bore, and sending an electrical signal to the robot indicating whether the tool strikes the lever and pivots it out of contact with the switch.

15 Claims, 2 Drawing Sheets

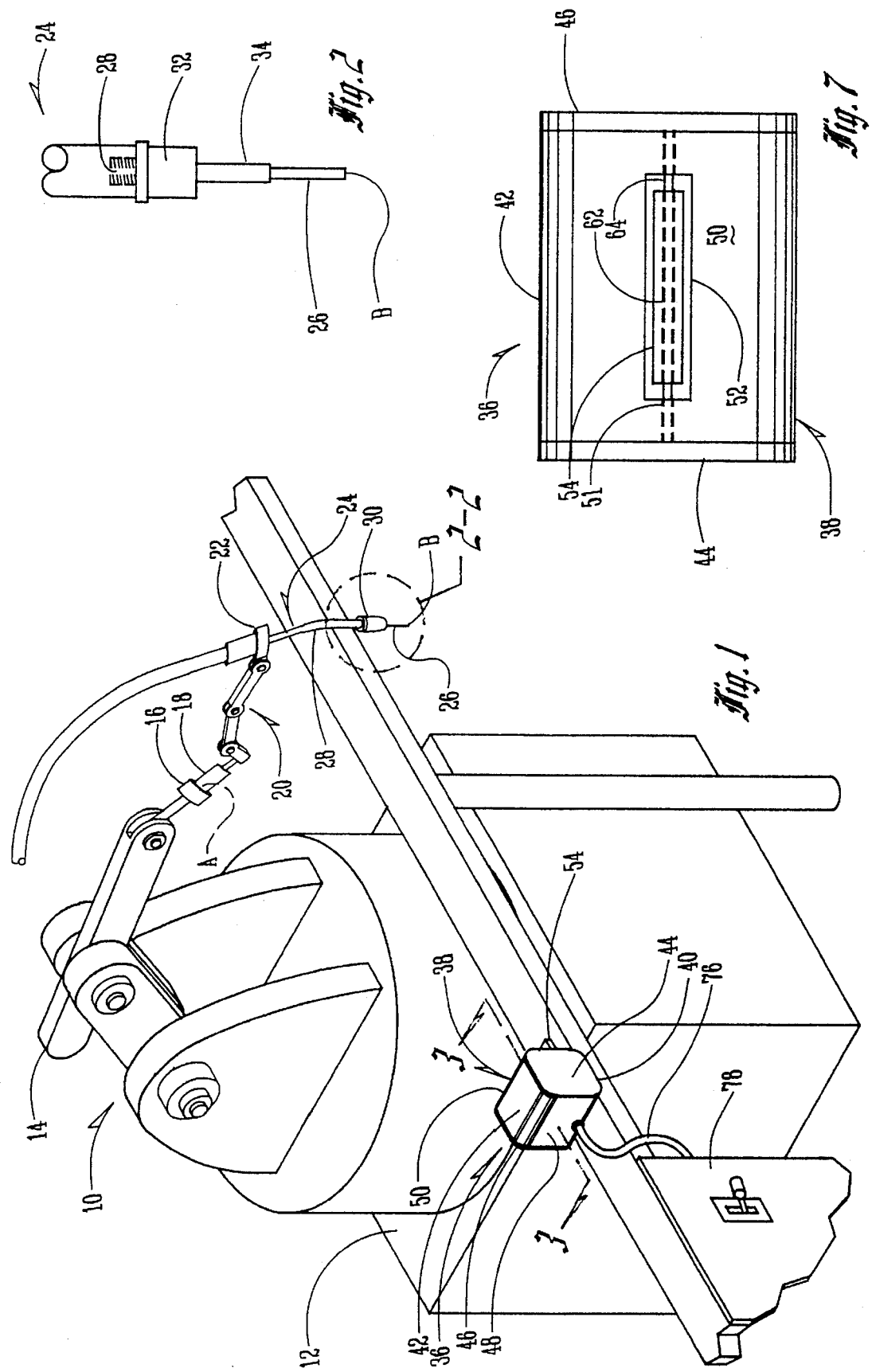

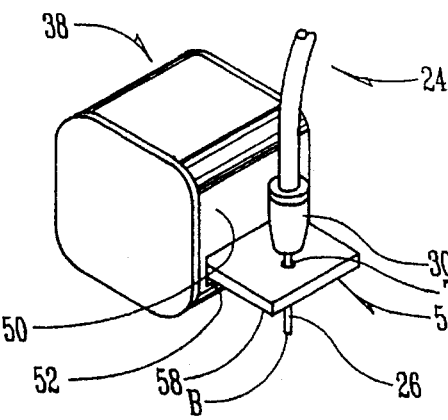
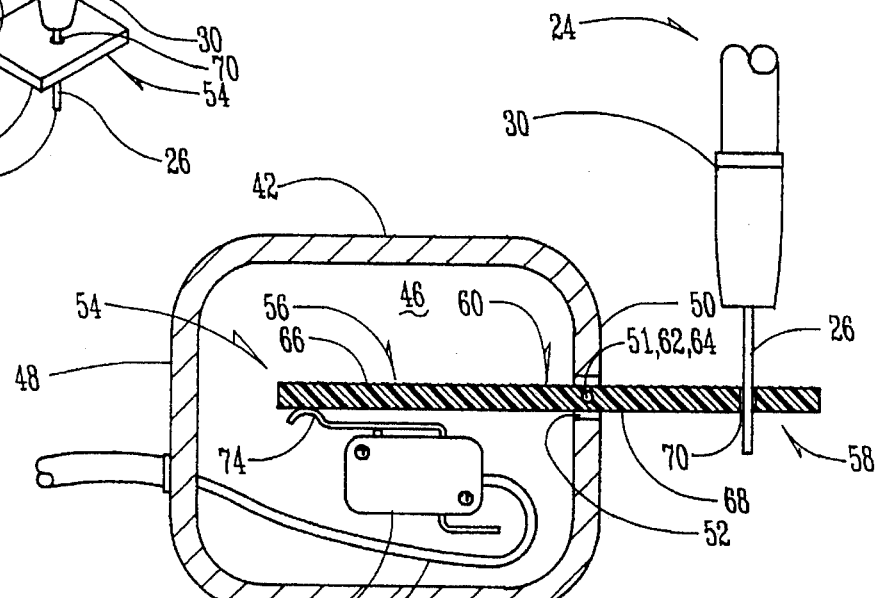
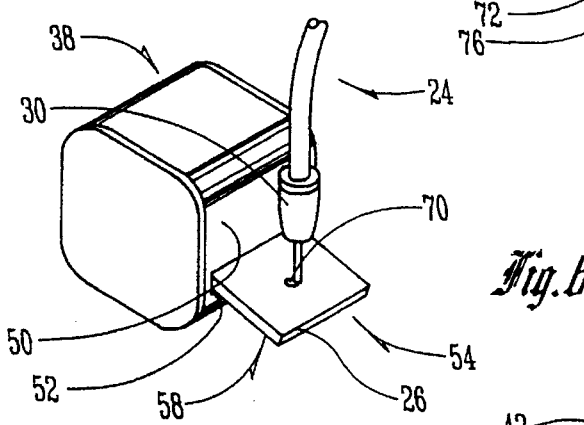
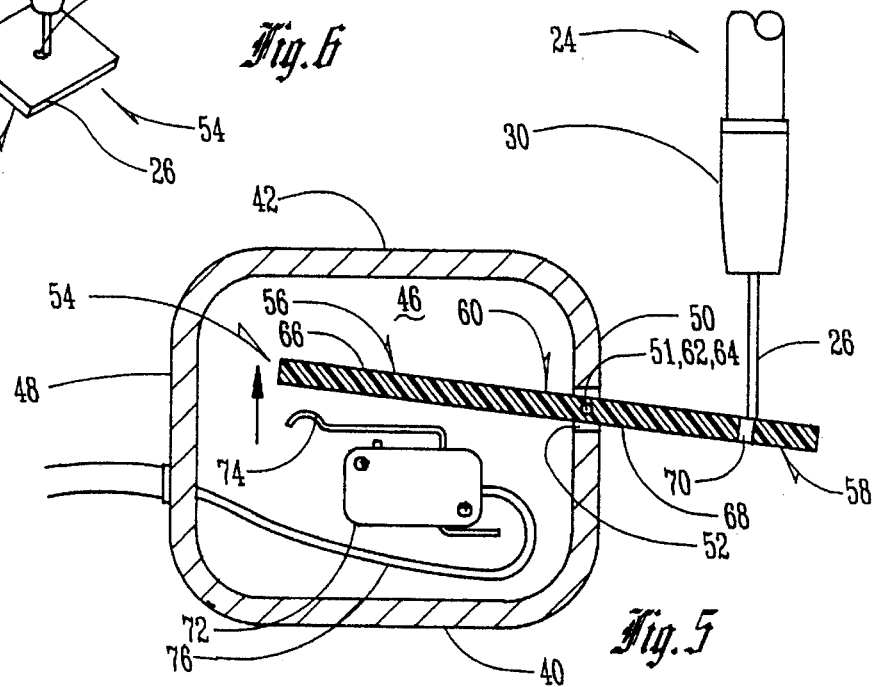

5,489,759

METHOD AND DEVICE FOR ALIGNING A TOOL HELD BY A ROBOT

BACKGROUND OF THE INVENTION

The present invention relates to a method and device for verifying proper alignment of a tool attached to a robotic arm. More particularly, the device and method allow teachable, automatic actions of a robotic welder to determine whether the welding electrode is properly positioned relative to the robot prior to welding. If there is misalignment for any reason, the automatic cycle can be halted and an operator alerted to identify the source. In short, the method and device address a problem that is generally referred to as "torch alignment" or "tool alignment" verification.

A brief discussion of a typical robotic welding system will be helpful in understanding the setting in which tool or torch alignments must be verified. A robotic welding system typically repeats a previously taught sequence of robot motions to deliver the welding torch to various seams on the work piece to be welded. The system inherently relies on the positional integrity of the robot motions, the work piece location, the torch location relative to the robot, and the consistency of the shape and alignment of the electrode wire. If too much unpredicted position deviation occurs in any component, the integrity of the delivered weld is jeopardized.

As a practical matter, torch misalignments occur frequently in robotic welding applications. Misalignments can be caused by a torch collision resulting in deviations in the torch or linkages, a robot collision resulting in deviations in the robot axes, deviations due to the replacement of consumables in the torch, mispositioning of the torch or linkages during maintenance activities, problems with the "cast" or "helix" of the wire electrode which cause it to bend unpredictable as it is fed from the torch (incoming wire stock or the wire feed system), deterioration of the torch consumables to the point where they cannot repeatably direct the wire electrode, and any other inadvertent shifting of the robot relative to the work piece as a result of a collision or maintenance activity. Welding with a misaligned torch can potentially damage the robot, the welding gear, and the work piece. Sometimes the damage to the work piece cannot be detected by the outward appearance of the weld. Many work pieces may be inadvertently produced with bad welds before the problem is detected.

Two widely used methods of tool or torch alignment are:

1. periodic manual intervention by the operator using a jig to check tool alignment, and
2. automatic execution of unique brand-specific robot algorithms relying on software and special robot features to detect and correct tool misalignments.

The manual intervention method used to detect and correct electrode misalignment involves manually stopping the automatic cycle of the robot and removing the torch nozzle from the body of the torch to expose the tip holder located thereunder. With the cap-like nozzle removed, the welding tip conventionally attached to the top holder can be removed and replaced with an alignment tool. Then, the alignment tool is positioned into an alignment jig that has been placed in a known position within the work envelope of the robot. Linkage adjustments are then made to match the robot arm to the gauge dimension and snugly fit the alignment tool in a bore or sliding sleeve on the alignment jig. Thus, the sliding sleeve is used as a go/no-go gauge to check the tool alignment and orientation with respect to the torch.

This manual intervention method has several shortcomings. First, deviations resulting from cast or helix conditions of the wire electrode are not detected since the wire electrode is removed for the alignment check. Furthermore, this method relies too heavily on the discipline of the operator to periodically interrupt the cycle and perform the alignment check. Finally, this method may result in a significant time delay between the occurrence and detection of an alignment problem, potentially allowing many pieces to be welded incorrectly in the interim. Often, the faulty welds are difficult, if not impossible, to detect visually.

The second common method of torch or tool alignment verification relies on a "touch sensing" feature which some robot manufacturers build into their robots. Robots so equipped can perform a "touch sense" on a gauge block placed in a known location. The robots know the exact location of the gauge block and use the torch or electrode to electrically detect the actual position of the gauge block relative to the torch. Since the exact position of the gauge block is known and fixed, all detected error is attributed to torch or tool position deviations. Using this information, the robot mathematically compensates for any misalignment by establishing a new theoretical tool point to control the path of the robot arm.

This touch sense and internal compensation method has several shortcomings. The method cannot distinguish between torch and robot alignment problems. If one or more of the robot axes is misaligned due to a crash, the robot will incorrectly attribute the error entirely to the torch. This method may also incorrectly adjust a tool point when the real problem is that the condition of the consumables is causing a lack of repeatability. Furthermore, when the robot attempts to compensate for substantial torch misalignments, the robot arm may encroach physical constraints at other points in the work envelope, thus causing serious damage to the arm itself as well as other equipment within the work envelope.

Therefore, a primary object of the present invention is the provision of an improved method and device for verifying proper alignment of the tool held by the arm of a robot.

A further object of the present invention is the provision of a device that detects both misalignment and misregistration of the tool with respect to its expected position.

A further object of the present invention is the provision of a method of verifying proper tool alignment while the tool is in the holder, thus avoiding having to manually remove the tool or disassemble and reassemble the tool assembly.

A further object of the present invention is the provision of a method that is teachable to the robot so as to facilitate the high quality, automatic production with the robot.

A further object of the present invention is the provision of a device and method that will signal misalignment of the tool from any cause.

A further object of the present invention is the provision of a device for verifying proper tool alignment that is adaptable to almost any kind of conventional robot.

A further object of the present invention is the provision of an alignment checking device that can be easily retrofitted to any existing robotic welding application.

A further object of the present invention is the provision of a device that can be mounted on or near the work piece such that the robot is taught to automatically check the alignment of an arc welding electrode in conjunction with the cycle for each part.

A further object of the present invention is the provision of a method that is particularly well-adapted to detecting dent, misaligned, or mislocated electrodes in a robotic welding system.

A further object of the present invention is the provision of an improved device for verifying alignment of robotically held tools that is economical to manufacture and durable in use.

These and other objects will become apparent from the following description of the invention.

SUMMARY OF THE INVENTION

The present invention relates to a device which can be mounted on or near the robot or workpiece fixture such that the robot can be taught to automatically check the alignment of the wire electrode with each part cycle. The device provides feedback to the robot for any type of misalignment inherent in the system. The invention comprises a mechanical means for automatic detection of electrode misalignment and an electrical means connected to the mechanical means so as to communicate any misalignment event to the robot.

The device for indicating the alignment of a tool held by the arm of a robot includes a frame, an electrical switch mounted on the frame and electrically connected to the robot and having a contact member mounted thereon for opening and closing the switch when the contact member is depressed by a first end of an elongated lever having a central portion pivotally connected to the frame. The lever is balanced and positioned such that the first end portions normally makes contact with the contact member of the switch in the absence of outside forces. The second end portion of the lever has a target bore for receiving the tool with a given clearance or tolerance for misalignment of the tool with respect to the bore. When the given tolerance is exceeded, the tool engages the second portion of the lever and forcibly pivots the first end portion of the lever out of contact with the contact member and thereby opens the switch to indicate misalignment of the tool.

The method of checking the alignment of a robotically held tool according to the present invention includes providing a gauge, in a known location with respect to the robot. The gauge has a pivotal lever with a target bore therein operatively connected to an electrical switch. The method further includes positioning the arm of the robot so that the tool held therein is theoretically aligned with the bore in the gauge, moving the arm so that the tool extends to a predetermined depth in the bore and sending to the robot a signal indicative of whether the tool has struck the lever so as to pivot it out of contact with the switch. Thus method can be performed at intervals or before the beginning of each cycle of work on the workpiece.

BRIEF DESCRIPTION OF THE DRAWINGS

FIG. 1 is a perspective view of a robotic arc welder equipped with the alignment device of the present invention.

FIG. 2 is an enlarged view of the area denoted 2—2 in FIG. 1 showing the working end of the torch with the nozzle removed.

FIG. 3 is an enlarged cross-sectional view of the alignment device of this invention taken along line 3—3 of FIG. 1.

FIG. 4 is an enlarged perspective view of the alignment device of the present invention showing the condition of the electrode and lever when the alignment of the electrode and robot is "good".

FIG. 5 is an enlarged cross-sectional view similar to FIG. 3 except the lever has been pivoted out of contact with the switch.

FIG. 6 is an enlarged perspective view of the alignment device of the present invention showing the position of the lever when the alignment of the electrode and/or robot is "no good".

FIG. 7 is a rear plan view of the alignment device of this invention showing the pivotal mounting of the lever to the rear wall.

DETAILED DESCRIPTION OF THE PREFERRED EMBODIMENT

In the figures and description which follows, reference numeral 10 generally refers to a robot used for various applications, including welding. As best seen in FIG. 1, the robot 10 includes a base 12 having a positionable arm 14 attached thereto in a conventional manner and a face plate 16 fixed to the free end of the arm 14.

A collision sensor 18 mounted to the robot face plate 16 signals the robot 10 to cease further motion when the arm unexpectedly strikes something. A series of linkages 20 connects the collision sensor 18 to a torch housing 22, which holds a torch 24. The linkages 20 allow for some manual adjustment of the torch 24 in case of minor damage to the torch or dimensional variations resulting from replacement torches. The torch 24 delivers and supplies an electrical current to a wire electrode 26.

Point A represents the position of the center of the robot face plate 16. Point B represents the position of the working end of the wire electrode and is commonly referred to as the "tool point". In order for the robot 10 to deliver welds properly, the position of the tool point B must be held repeatable with respect to point A within very close tolerances, typically +/− 0.010 of an inch. Furthermore, the entire robot 10 needs to be repeatably positionable with respect to the workpiece within similar tolerances.

As best seen in FIG. 1, the torch 24 has a torch body 28 having a nozzle 30 detachably attached to the lower end thereof in a conventional manner. In FIG. 2, the nozzle 30 has been removed to show that a welding tip 32 is disposed at the lower end of the torch body 28 and is normally shielded by the nozzle 30. A tip holder 34 for holding the wire electrode 26 is fastened to the welding tip 32 in a conventional manner. From FIGS. 1 and 2, it is apparent that the nozzle 30 also shields the tip holder 34.

Referring to FIG. 1, an alignment indicator 36 is mounted within the reach the robot 10. It is contemplated that the alignment indicator 36 may also be mounted directly on a stationary portion of the robot such as the base 12. Indicator 36 can also be mounted on the fixture which holds the workpiece (not shown). The alignment indicator 36 includes a prismatic housing 38 having a bottom wall 40, a top wall 42, opposite side walls 44 and 46, and opposite front and rear wall 48 and 50. Preferably, a rectangular-shaped hollow tube provides wall 40, 42, 48 and 50. This makes it possible to easily access the components inside the housing for assembly, installation, and repair. Cover plates are attached by conventional means to the open ends so as to define wall 44 and 46.

As best seen in FIG. 7, a mounting hole 51 is formed in rear wall 50 and extends parallel to the bottom wall 40. Preferably, for greater ease of assembly and commonality of parts, the hole 51 extends completely through the width of rear wall 50. The rear-wall 50 also has an aperture 52 which is aligned with the mounting hole 51 and extends horizontally across the rear wall 50, as best seen in FIGS. 3–5.

An elongated lever 52 is pivotally mounted to the prismatic housing 38 such that a first end portion 54 extends inside the prismatic housing and a second end portion 56 extends beyond the outside of the prismatic housing 38. As best seen in FIGS. 1 and 3, the elongated lever 54 also includes a central portion 60 which is pivotally mounted in the aperture 52 of the housing 38 by a pivot pin 64 that is inserted through the hole 51 and a mounting hole 62 extending through the width of the lever 54.

Preferably, the pivotal connection of the elongated lever 54 and the rear wall 50 is accomplished by aligning mounting holes 51 and 62 and inserting an elongated pivot pin 64 through the rear wall 50 on both sides of the aperture and the lever 54 therebetween. It is contemplated, however, that the pivot pin 64 may extend through the rear wall 50 on only one side of break out at neither end of the rear-wall. The pivot pin 64 can also be integrally formed in rear-wall 50 or alternately, on the lever 54.

The elongated lever 54 has top and bottom surfaces 66 and 68, which are preferably planar, and smooth. Furthermore, the second end portion 58 of the elongated lever 54 has a preferably cylindrical vertical target bore 70 therein whose diameter corresponds to the diameter of the wire electrode 26 plus a given clearance or tolerance for misalignment of the wire electrode. For example, a vertical bore 70 with a diameter of 0.060 of an inch is preferred for a wire electrode 26 having a diameter of 0.040 of an inch. However, the target hole can be constructed to accommodate different sizes of tools or wire electrodes, as well as the user's particular alignment tolerance requirements. The vertical target bore 70 is disposed perpendicular to the holes 51 and 62, as well as to the bottom wall 40 of the housing 38. For ease of teaching the robot 10, it is also prudent to align the target bore 70 with one of the robot axes upon installation. This also helps eliminate any perpendicularity deviations from the manufacturers installation assembly of the indicator 36.

An electrical switch 72 mounts to the side-wall 46 and is disposed below the first end portion 56 of the lever 54. The switch 72 has a contact member 74 mounted thereon for opening and closing the switch 72. The switch 72 is connected by conventional means, such as electrical wires or cords 76, to the controller 78 for the robot 10. Thus, the status or condition of the switch 72 (open or closed) can be communicated to the robot 10.

Preferably, the indicator 36 is mounted so that the lever 54 extends horizontally. As a result, the position of the mounting hole 62 can be set so as to balance the lever 54 about the pivot pin 64. With the mounting hole 62 closer to the second end portion 58 than the first end portion 56, more of the lever 54 extends inside the housing 36 and teeters about the pivot pin 64. Thus, gravity will tend to overcome the relatively low inertia of the rectangular, blade-like lever 54 and cause the bottom surface 68 of the first end portion 56 to depress and rest on the contact member 74 on the switch 72 in the absence of outside forces.

The switch 72 can also be selected so as to open and close at certain levels of force. In the preferred embodiment, a simulated roller switch manufactured by Honeywell Microswitch of Freeport, Ill. (part number V3L-1123-D8) has been utilized. This switch advertises an O.F. Max of 1.4 ounces and a R.F. Max of 0.18 ounces.

Based on the foregoing, it is apparent that this invention provides flexibility in setting the indicator to open the switch when the second end portion is struck with a desired threshold force and yet not deform or bend the wire electrode. The teeter-totter lever of this invention allows it to convert a mechanical indication of alignment into an electrical indication of one.

In operation, the alignment indicator 36 of the present invention provides a teachable method of checking for misalignment of a tool, such as a wire electrode 26 in an automated fashion. The check for alignment may be performed whenever a tool is changed; after a crash; at regular, random, or predetermined intervals; at the beginning of each cycle undertaken on the workpiece; or whenever the operator deems it prudent.

First, the alignment indicator 36 of the present invention is mounted to the base 12 of the robot 10, the fixture for the workpiece, or any other known location within the reach of the arm 14 of the robot 10. Before the welding cycle begins, the robot is taught the movements necessary to perform the alignment check. To initiate the alignment check, the robot 10 positions the wire electrode 26 over the target bore 70 of the alignment device based on the expected or theoretical position of the wire electrode 26. Next, the robot tries to move the theoretically aligned wire electrode 26 straight into target bore 70.

FIG. 4 and 5 illustrate the possible results of the alignment check. In FIG. 4, the wire electrode 26 is properly aligned within the given tolerance. Therefore, the robot 10 is able to insert the wire electrode 26 fully into the target bore 70 to the programmed depth without striking the second end portion 58 of the lever 54. Thus, the first end portion 56 of the lever 54 remains engaged with the contact member 74 so as to keep switch 72 closed. A closed switch indicates to the robot that the wire electrode 26 has "good" alignment. Based on this information, the robot 10 can proceed with the necessary welding on the workpiece.

In FIG. 5, the robot 10 has attempted to insert the wire electrode 26 into the target bore 70, but the wire electrode 26 has missed the target hole 70. The downward movement of the wire electrode 26 causes it to strike and depress the second end portion 58 of the lever 54. Consequently, the first end portion is pivoted away from the contacting member 74 of the switch 72. When the first end portion 56 of the lever 54 pivots away from the contact member 74 of the switch 72 opens. The open switch 72 signals to the robot that the wire electrode 26 is misaligned. In this event, the robot can be programmed to interrupt the automated operation, issue a sensory signal to alert the operator of the situation, and wait for the operator to manually intervene and investigate the source of the misalignment.

Because the alignment indicator of this invention checks for misalignment directly at the point of the tool, misalignment will be detected regardless of its source. Robot problems are picked up just as well as torch or tool problems. Furthermore, automatic, quick, and frequent checks are facilitated with the present invention. When frequent alignment checks are performed with the device and method of this invention, problems with consumables are more likely to be identified and corrected.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A device for indicating the alignment of a tool held by an arm of a robot, comprising:

a frame mounted at a known coordinate within the reach of the arm of the robot;

an electrical switch mounted on the frame and connected to the robot, the switch having a contact member mounted thereon for opening and closing the switch;

an elongated lever having top and bottom surfaces, opposite sides, opposite first and second end portions and a central portion therebetween pivotally connected to the frame such that the first end portion normally makes contact with the contact member of the switch in the absence of outside forces on the lever;

the second end portion of the lever having a target bore therein for receiving the tool held by the arm of the robot with a given tolerance for misalignment of the tool with respect to the bore;

whereby when the given tolerance is exceeded the tool engages the second end portion of the lever and forcibly pivots the first end portion out of contact with the contact member, thereby opening the switch to indicate misalignment of the tool with respect to the target bore.

2. A device according to claim 1 wherein the frame is comprised of a prismatic housing having a plurality of side walls and one of the side walls has an aperture therein for receiving and pivotally mounting the lever.

3. A device according to claim 2 wherein the lever has a mounting hole therein for receiving a pivot pin mounted on the housing for pivotally mounting the lever in the aperture.

4. A device according to claim 3 wherein the target bore is perpendicular to the mounting hole in the lever.

5. A device according to claim 1 wherein the first and second end portions pivot about a horizontal axis defined by the pivotal connection with to the frame.

6. A device according to claim 1 wherein the robot has a stationary potion and the frame is mounted on the stationary portion.

7. A device according to claim 1 wherein the frame is mounted on a welding fixture located adjacent to the robot.

8. A device according to claim 1 wherein the lever has a center of gravity aligned with the pivotal connection of the lever to the frame.

9. A device according to claim 1 wherein the contact member comprises a depressible arm extending from the switch.

10. A device according to claim 1 wherein the tool attached to the arm of the robot is an electrode for arc welding.

11. A device according to claim 1 wherein the target bore has a circular cross-section.

12. A device according to claim 1 wherein the target bore extends completely through the lever.

13. A device according to claim 1 wherein the lever is a thin rectangular plate having a width and a thickness less than one-fourth the width and a low mass moment of inertia with respect to the pivotal connection with the frame such that the lever pivots to break contact with the contact member when the tool strikes the second end portion of the lever without bending the tool.

14. In combination, a robot having a base portion and a positionable arm extending therefrom and a tool held by the arm, and an inspection device for verifying the alignment of the tool with respect to the base portion, comprising:

a frame mounted a known coordinate within the reach of the arm of the robot;

an electrical switch mounted on the frame and connected electrically to the robot, the switch having a contact member mounted thereon for opening and closing the switch;

an elongated lever having top and bottom surfaces, opposite sides, and opposite first and second end portions and a central portion therebetween pivotally connected to the frame, the lever being balanced about the pivotal connection such that the first end portion normally makes contact with the contact member of the switch in the absence of outside forces on the lever and breaks contact with the contact member if sufficient outside forces are applied to the lever; and the second end portion of the lever having a target bore therein for receiving the tool held by the arm of the robot with a given tolerance for misalignment of the tool with respect to the bore;

whereby when the given tolerance is exceeded the tool engages the second end portion of the lever and forcibly pivots the first end portion out of contact with the contact member and thereby opening the switch to indicate misalignment of the tool with respect to the target bore and the robot.

15. A method of checking the alignment of a tool held by a positionable arm of a robot, the method comprising:

providing a gauge in a known location with respect to the robot, the gauge having a frame with an elongated lever having first and second ends and being pivotally mounted to the frame between the ends, the second end having a target bore therein for receiving the tool with a given tolerance, in the absence of outside forces the first end rests in contact with a switch mounted on the frame and having a contact member thereon;

positioning the arm of the robot so that the tool is theoretically aligned with the target bore in the gauge;

moving the arm so that the tool should extend a predetermined depth into the target bore;

sending a signal to the robot indicative of whether the tool has struck the first end of the lever with sufficient force to pivot the second end out of contact with the contact member of the switch;

if the contact between the lever and the switch has been broken, then halting the movement of the arm of the robot and alerting to an operator to investigate and correct the misalignment situation;

if the lever remains in contact with the switch, then withdrawing the tool from the target bore; and continuing to perform work tasks with the tool.

* * * * *